(12) United States Patent
Fan et al.

(10) Patent No.: US 12,554,564 B2
(45) Date of Patent: Feb. 17, 2026

(54) SMART CASE SCENARIO DESIGN MECHANISM FOR REPRODUCING CUSTOMER ISSUES

(71) Applicant: Dell Products L.P., Round Rock, TX (US)

(72) Inventors: Huijuan Fan, Chengdu (CN); Changxu Jiang, Chengdu (CN); Stephen Junhua Shao, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 15 days.

(21) Appl. No.: 18/660,307

(22) Filed: May 10, 2024

(65) Prior Publication Data

US 2025/0335279 A1   Oct. 30, 2025

(30) Foreign Application Priority Data

Apr. 26, 2024   (CN) .......................... 202410516254.2

(51) Int. Cl.
  *G06F 11/00*   (2006.01)
  *G06F 11/07*   (2006.01)
(52) U.S. Cl.
  CPC ................................. *G06F 11/0751* (2013.01)
(58) Field of Classification Search
  CPC .................................................. G06F 11/0751
  USPC ........................................................ 714/1–57
  See application file for complete search history.

(56) References Cited

U.S. PATENT DOCUMENTS

| | | | |
|---|---|---|---|
| 2014/0164184 A1* | 6/2014 | Akolkar | G06Q 30/0627 |
| | | | 705/26.61 |
| 2019/0073528 A1* | 3/2019 | Agarwalla | G06V 30/413 |
| 2020/0327005 A1* | 10/2020 | Singh | G06F 11/302 |
| 2021/0256397 A1* | 8/2021 | Tiwari | G06N 3/044 |
| 2021/0374164 A1* | 12/2021 | Ghoula | G06N 20/00 |
| 2022/0269412 A1* | 8/2022 | Levy | G06F 3/067 |
| 2022/0318826 A1* | 10/2022 | Johnston | G06F 16/24578 |
| 2024/0403333 A1* | 12/2024 | Bertschinger | G06F 16/287 |
| 2025/0225115 A1* | 7/2025 | Nguyen | G06F 16/215 |

* cited by examiner

*Primary Examiner* — Sarai E Butler
(74) *Attorney, Agent, or Firm* — Krishnendu Gupta; Lesley Leonessa

(57) ABSTRACT

Methods, system, and non-transitory processor-readable storage medium for an issue replication system are provided herein. An example method includes receiving, by an issue replication system, a resolution request from an issue resolution system, where the resolution request is associated with an issue occurring on an information system. The issue replication system assigns at least one metric to the resolution request, and stores the metric in a graph-like data structure. The issue replication system calculates a similarity score between the graph-like data structure and each of a plurality of graph-like data structures from a resolution repository.

20 Claims, 8 Drawing Sheets

| Step1: STIG is enabled. | STIG | N/A | N/A | 72h | Precondition |
|---|---|---|---|---|---|
| Step2: there exists background IO. | Any IO tool on any object | N/A | CPU>80% | 72h | Run after Step 1 |
| Step3: NFSv4 file systems are created. | NFSv4 FSs | [50, 200] | N/A | 72h | Run after Step 1 |
| Step4: Async replication session are created for these NFSv4 FSs. | NFSv4 replication session | [50, 200] | RPO < 1 h | 72h | Run after Step 3 |
| Step5: run LDX to these NFSv4 FSs in parallel. | LDX NFSV4 | [1000,3000] concurrent workers; [50, 200] FSs; | IOPS>20000 | 72h | Run after Step 3 |
| Step6: scheduled snapshots are created on these NFSv4 FSs. | Snap on NFSv4 | Internal [10 mins, 30 mins]; [50, 200] NFSv4 FSs | N/A | 48h | Run after Step 3 |
| Step7: Node reboot inserted. | Node A | Single node | N/A | 1 time | Run after Step 4 |

FIG. 3

SMART CASE SCENARIO DESIGN MECHANISM FOR REPRODUCING CUSTOMER ISSUES

FIELD

The field relates generally to resolving customer issues rapidly, and more particularly to replicating customer issues so as to resolve them in information processing systems.

BACKGROUND

Providing a quick response and accurate resolution when defect issues occur in an information processing system is a competitive strategy that will set a company apart from the competition. Rapidly and accurately replicating defect issues to resolve them quickly for customers, therefore, is critical to the success of a company.

SUMMARY

Illustrative embodiments provide techniques for implementing an issue replication system in a storage system. For example, illustrative embodiments provide an issue replication system that receives a resolution request from an issue resolution system, where the resolution request is associated with an issue occurring on an information system. The issue replication system assigns at least one metric to the resolution request, and stores the metric in a graph-like data structure. The issue replication system calculates a similarity score between the graph-like data structure and each of a plurality of graph-like data structures from a resolution repository. The issue replication system selects a subset of the plurality of graph-like data structures based on a comparison of the similarity score with a similarity threshold, and identifies at least one of the subset of the plurality of graph-like data structures for a replication effort to replicate the issue. Other types of processing devices can be used in other embodiments. These and other illustrative embodiments include, without limitation, apparatus, systems, methods and processor-readable storage media.

BRIEF DESCRIPTION OF THE DRAWINGS

FIG. 3 illustrates an example of key steps and metrics associated with an example customer issue in an illustrative embodiment.

DETAILED DESCRIPTION

Figure 1:
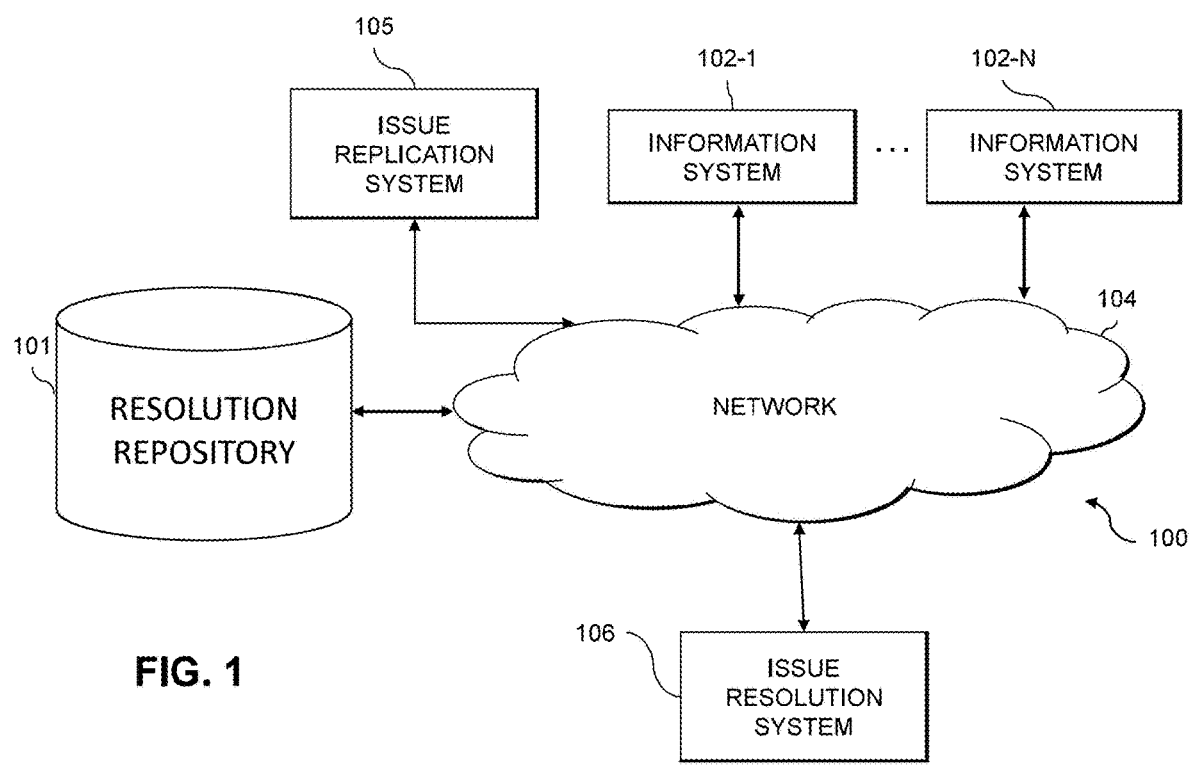
FIG. 1 shows an information processing system including an issue replication system in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing an issue replication system, which technique may be used to provide, among other things, key steps and parameters to replicate customer issues for resolution of those issues by receiving, by an issue replication system, a resolution request from an issue resolution system, where the resolution request is associated with an issue occurring on an information system. The issue replication system assigns at least one metric to the resolution request, and stores the metric in a graph-like data structure. The issue replication system calculates a similarity score between the graph-like data structure and each of a plurality of graph-like data structures from a resolution repository. The issue replication system selects a subset of the plurality of graph-like data structures based on a comparison of the similarity score with a similarity threshold, and identifies at least one of the subset of the plurality of graph-like data structures for a replication effort to replicate the issue.

When customers experience issues during the execution of information systems, the first step in resolving the issue is reproducing/replicating the customer's issue. Conventional technologies for replicating and resolving defect issues involve manual processes where one expert (i.e., an architect) looks at the defect issue, and repeatedly tries to determine the key steps required to replicate the issue. Conventional technologies for replicating and resolving defect issues delay the actual resolution of the customer issues and waste engineering time by iteratively manually trying to replicate the customer issue. Conventional technologies for replicating and resolving defect issues that rely solely on manually replicating customer issues lack consistency since different architects will provide different replication suggestions. Conventional technologies for replicating and resolving defect issues fail to have a defined template with which to identify key steps for replication, and therefore can easily omit critical information, thereby delaying the effort to replicate the customer issue. For example, an architect may identify a system requires a high input-output (IO) load and high central processing unit (CPU) usage, but fail to define how high of an IO load and how high of CPU usage. Time is wasted then, with the trial and error required to determine how high of an IO load and how high of CPU usage. Conventional technologies for replicating and resolving defect issues fail to provide multiple replication scenarios that expedite the issue replication and resolution process.

By contrast, in at least some implementations in accordance with the current technique as described herein, key steps and parameters for issue replication are determined by receiving, by an issue replication system, a resolution request from an issue resolution system, where the resolution request is associated with an issue occurring on an information system. The issue replication system assigns at least one metric to the resolution request, and stores the metric in a graph-like data structure. The issue replication system calculates a similarity score between the graph-like data structure and each of a plurality of graph-like data structures from a resolution repository. The issue replication system selects a subset of the plurality of graph-like data structures based on a comparison of the similarity score with a similarity threshold, and identifies at least one of the subset of the plurality of graph-like data structures for a replication effort to replicate the issue.

Thus, a goal of the current technique is to provide a method and system for providing an issue replication system that can rapidly identify and replicate complex defect issues so as to assist in the resolution of the defect issues. Another goal is to reduce the delay resulting from engineers iteratively manually trying to replicate the customer issue. Another goal is to provide a defined template with which to identify key steps and critical information for customer issue replication. Yet another goal is to efficiently provide multiple replication scenarios that expedite the issue replication and resolution process.

In at least some implementations in accordance with the current technique described herein, the use of an issue replication system can provide one or more of the following advantages: provide an automated system that efficiently provides replication details for resolving customer issues, provide a defined template with which to identify key steps and critical information for replication of customer issues, and provide multiple replication scenarios to expedite the issue replication and resolution process.

In contrast to conventional technologies, in at least some implementations in accordance with the current technique as described herein, key steps and parameters for issue replication are determined by receiving, by an issue replication system, a resolution request from an issue resolution system, where the resolution request is associated with an issue occurring on an information system. The issue replication system assigns at least one metric to the resolution request, and stores the metric in a graph-like data structure. The issue replication system calculates a similarity score between the graph-like data structure and each of a plurality of graph-like data structures from a resolution repository. The issue replication system selects a subset of the plurality of graph-like data structures based on a comparison of the similarity score with a similarity threshold, and identifies at least one of the subset of the plurality of graph-like data structures for a replication effort to replicate the issue.

In an example embodiment of the current technique, the issue replication system adds the graph-like data structure to the plurality of graph-like structures, where a similarity score is calculated between the graph-like structure and a second graph-like structure associated with a subsequent resolution request.

In an example embodiment of the current technique, the issue replication system normalizes replication details associated with the issue using at least one metric.

In an example embodiment of the current technique, at least one metric comprises at least one of object, scale, performance, duration, and dependency.

In an example embodiment of the current technique, the issue replication system generates the similarity score using semantic matching of the graph-like data structure.

In an example embodiment of the current technique, the semantic matching comprises structure preserving semantic matching.

In an example embodiment of the current technique, the graph-like data structure is a tree-like data structure.

In an example embodiment of the current technique, at least one metric comprises at least one key step required to replicate the issue and at least one parameter associated with at least one key step.

In an example embodiment of the current technique, the issue replication system generates the similarity score by matching an internal node, representing at least one key step, with a second internal node, and by matching a leaf node, representing at least one parameter, with a second leaf node, where the graph-like data structure comprises the internal node and the leaf node, and where one of the plurality of graph-like data structures comprises the second internal node and the second leaf node.

In an example embodiment of the current technique, the issue replication system applies filtering rules to the plurality of graph-like data structures to obtain the subset.

In an example embodiment of the current technique, the issue replication system selects the subset of the plurality of graph-like data structures that have a respective similarity score that exceeds the similarity threshold.

In an example embodiment of the current technique, the issue replication system selects a first subset of the plurality of graph-like data structures that have a respective similarity score that falls within a range associated with the similarity threshold, and selects the subset of the first subset that have a respective similarity score that is closest to the similarity threshold.

In an example embodiment of the current technique, the issue replication system determines that the respective similarity score associated with the plurality of graph-like data structures is not within a range of the similarity threshold, and identifies a first subset of the plurality of graph-like data structures for enhancement to create new graph-like data structures, where the comparison between the graph-like data structure and the new graph-like data structures results in a similarity score that is within a range associated with the similarity threshold.

In an example embodiment of the current technique, the issue replication system identifies key steps and parameters associated with the first subset of the plurality of graph-like data structures for modification to create the new graph-like data structures.

In an example embodiment of the current technique, the issue replication system outputs key steps and parameters associated with at least one of the subset, where the key steps and parameters are used to replicate the issue for resolution of the issue.

FIG. 1 shows a computer network (also referred to herein as an information processing system) 100 configured in accordance with an illustrative embodiment. The computer network 100 comprises a resolution repository 101, issue replication system 105, and information systems 102-N. The resolution repository 101, issue replication system 105, and information systems 102-N are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is an issue replication system 105 that may reside on a storage system. Such storage systems can comprise any of a variety of different types of storage including network-attached storage (NAS), storage area networks (SANs), direct-attached storage (DAS) and distributed DAS, as well as combinations of these and other storage types, including software-defined storage.

Each of the information systems 102-N may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The information systems 102-N in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the issue replication system 105 are one or more input-output devices, which illustratively comprise keyboards, displays or other types of input-output devices in any combination. Such input-output devices can be used, for example, to support one or more user interfaces to the issue replication system 105, as well as to support communication between the issue replication system 105 and other related systems and devices not explicitly shown. For example, a dashboard may be provided for a user to view a progression of the execution of the issue replication system 105. One or more input-output devices may also be associated with any of the information systems 102-N.

Additionally, the issue replication system 105 in the FIG. 1 embodiment is assumed to be implemented using at least one processing device. Each such processing device generally comprises at least one processor and an associated memory, and implements one or more functional modules for controlling certain features of the issue replication system 105. More particularly, the issue replication system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the issue replication system 105 to communicate over the network 104 with the resolution repository 101, and information systems 102-N and illustratively comprises one or more conventional transceivers.

An issue replication system 105 may be implemented at least in part in the form of software that is stored in memory and executed by a processor, and may reside in any processing device. The issue replication system 105 may be a standalone plugin that may be included within a processing device.

It is to be understood that the particular set of elements shown in FIG. 1 for issue replication system 105 involving the resolution repository 101, and information systems 102-N of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the issue replication system 105 can be on and/or part of the same processing platform.

An exemplary process of issue replication system 105 in computer network 100 will be described in more detail with reference to, for example, the flow diagram of FIG. 2.

Figure 2:
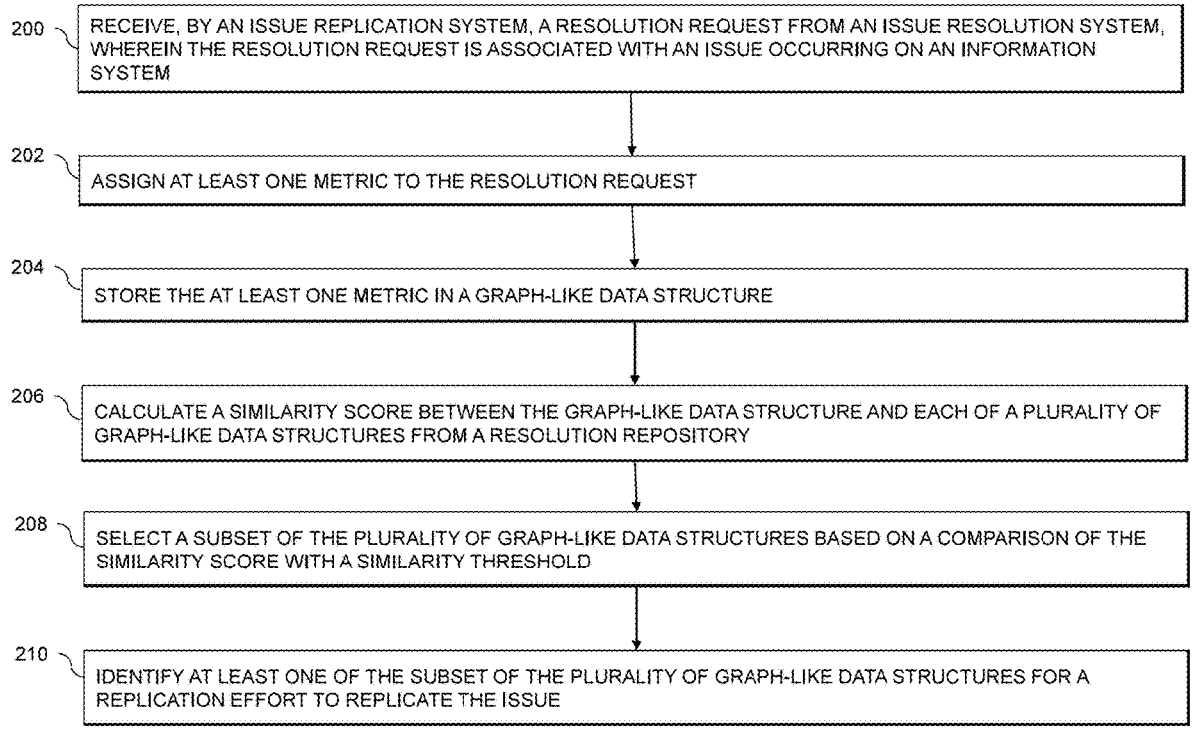
FIG. 2 shows a flow diagram of a process for an issue replication system in an illustrative embodiment.

FIG. 2 is a flow diagram of a process for execution of the issue replication system 105 in an illustrative embodiment. It is to be understood that this particular process is only an example, and additional or alternative processes can be carried out in other embodiments.

At 200, the issue replication system 105 receives a resolution request from an issue resolution system 106, where the resolution request is associated with an issue occurring on an information system 102-N. In an example embodiment, customers experiencing problems enter their issues into an issue resolution system 106. The issue resolution system 106 transmits the resolution request associated with the issue to the issue replication system 105. Real time customer service systems (such as the issue resolution system 106) receive many urgent customer issues that need immediate resolutions. The first step in the resolution process is to simulate/replicate/reproduce the customer's scenario to locate the issue trigger point.

At 202, the issue replication system 105 assigns at least one metric to the resolution request. In an example embodiment, a key step definition template is utilized to normalize the reproduction scenario details (i.e., the "key steps" required to replicate the issue and the parameters associated with each of those key steps). In an example embodiment, the replication details associated with the issue are normalized using at least one of the metrics. In an example embodiment, an expert, such as an architect analyzes the issue associated with the resolution request. The expert may provide some initial steps needed to replicate the issue.

In an example embodiment, the metrics comprise at least one of object, scale, performance, duration, and dependency. The object metric represents the detailed object types, input output (IO) types, etc. The scale metric represents the number of created objects, such as the IO tool threads, etc.

The performance metric represents the performance status of the steps (i.e., "key steps"), such as central processing unit (CPU), input/output operations per second (IOPS), free memory, etc. The duration metric represents the runtime of the key step. The dependency (or precondition) metric represents marking a key step as a precondition of the customer scenario or marking a key step as a step that must be executed after another dependent step. In an example embodiment, an expert may supply the key steps, taking care to provide as much detail as possible, such as dependencies, preconditions, etc. In an example embodiment, the key steps are defined from a test design perspective. FIG. 3 illustrates an example of key steps and metrics associated with a customer issue.

Figure 4:
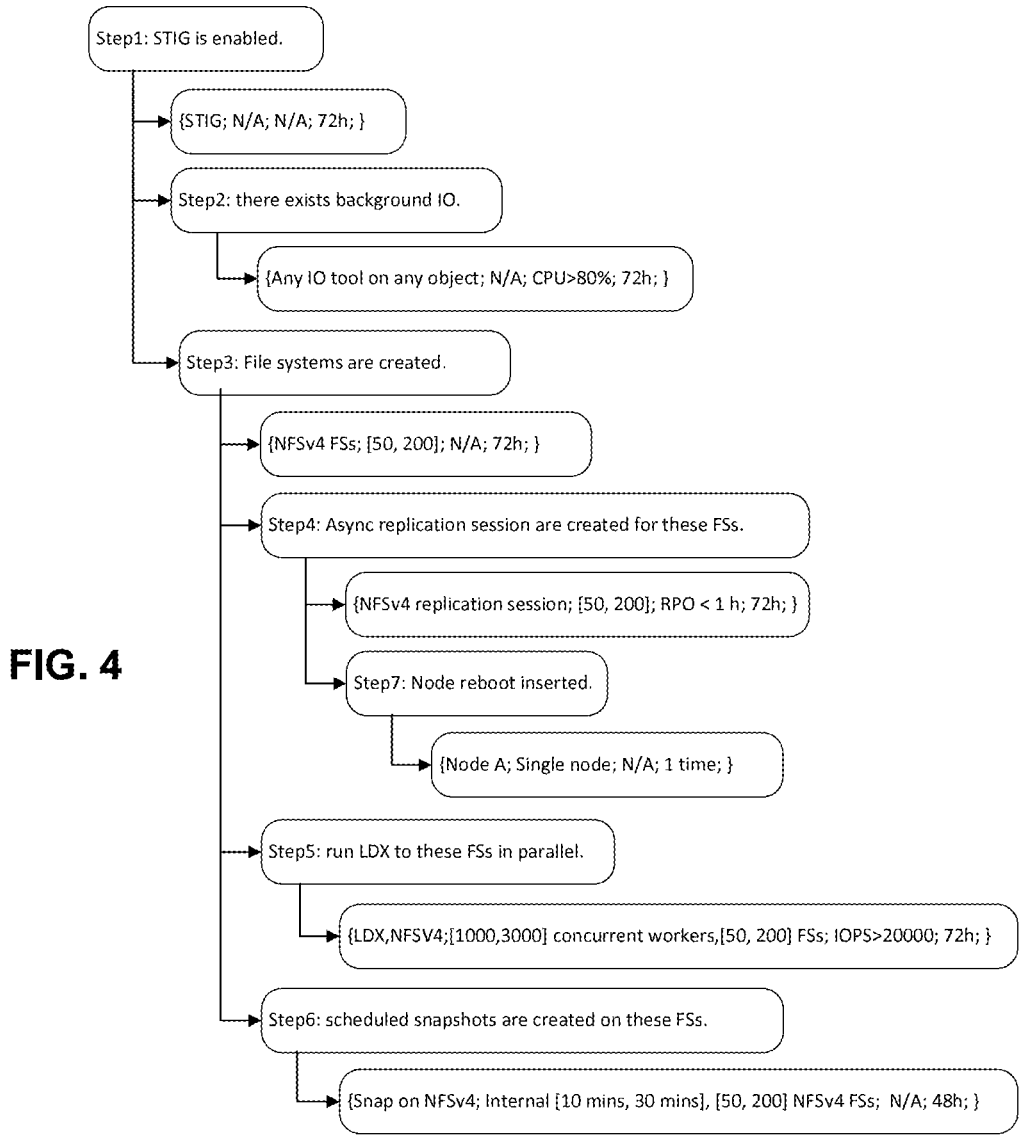
FIG. 4 illustrates an example tree-like structure derived from key steps and metrics in an illustrative embodiment.

At 204, the issue replication system 105 stores the metrics in a graph-like data structure. In an example embodiment, issues may be represented as a tree-like structure where each key step is an internal node, and the associated parameters are represented as a leaf node. FIG. 4 illustrates an example tree-like structure derived from the key steps and metrics illustrated in FIG. 3.

At 206, the issue resolution system 106 calculates a similarity score between the graph-like data structure and each of a plurality of graph-like data structures from a resolution repository 101. The issue resolution system 106 calculates the similarity score $S_{case\ i}$ between the key steps defined for the issue (as illustrated in FIG. 4) and a historical case i, where the resolution repository 101 comprises a plurality of historical cases n, and where each of the historical cases are represented as a graph-like data structure. In an example embodiment, each of the historical cases n is a previously identified issue. In an example embodiment, as the issue resolution system 106 transmits each customer issue to the issue replication system 105, the issue replication system 105 calculates the similarity (i.e., matching) score $S_{case\ i}$ against all existing historical cases n (i.e., test cases). The higher the score, the higher the probability that the historical case i should be selected to assist in replicating the customer issue.

In an example embodiment, the issue replication system 105 generates the similarity score using semantic matching of the graph-like data structure. In other words, a natural language processing and semantic matching tool is utilized to evaluate the matching degree between the customer issue and historical issues. In an example embodiment, the semantic matching comprises structure preserving semantic matching. In other words, semantic matching is performed between two tree-like data structures, producing a global similarity score between the tree-like data structures, and a set of correspondences between the nodes. The correspondences preserve a set of structural properties, for example, one-to-one correspondences between semantically related nodes, leaf nodes are matched to leaf nodes and internal nodes are matched to internal nodes. Thus, the structure preserving semantic matching technique compares the key steps of the customer issues to establish whether two cases (i.e., the customer issue and a historical case from the resolution repository 101) are similar enough to create an adaptor that maps the components of these key steps.

As noted above, in an example embodiment, the graph-like data structure is a tree-like data structure. In an example embodiment, at least one metric comprises at least one key step required to replicate the issue and at least one parameter associated with at least one key step as illustrated in FIG. 4.

In an example embodiment, the issue replication system 105 generates the similarity score by matching an internal node, representing at least one key step, with a second internal node. In an example embodiment, issue replication system 105 generates the similarity score by matching a leaf node, representing at least one parameter, with a second leaf node. The graph-like data structure comprises the internal node and the leaf node, and one of the plurality of graph-like data structures in the resolution repository 101 comprises the second internal node and the second leaf node.

At 208, the issue replication system 105 selects a subset of the plurality of graph-like data structures based on a comparison of the similarity score with a similarity threshold. In an example embodiment, the issue replication system 105 applies filtering rules to the plurality of graph-like data structures to obtain the subset.

For example, the issue replication system 105 selects the subset of the plurality of graph-like data structures that have a respective similarity score that exceeds the similarity threshold. In an example embodiment, the similarity threshold is determined by various situations and accuracy requirements. The similarity threshold may also be determined by real world practices. In an example embodiment, the issue replication system 105 selects the graph-like data structures that have a similarity score higher than the similarity threshold, and adds those to an issue replication case list (i.e., the subset). For example, in an example embodiment, the similarity threshold is 98%. After the semantic matching, there are multiple historical cases with a similarity score higher than 98%. Those historical cases are added to the issue replication case list. This indicates that the existing historical cases in the resolution repository 101 (and specifically the historical cases with a similarity score higher than 98%) are sufficient to cover the key steps defined for the customer issue, meaning the historical cases are very similar to the customer's issue scenario.

In an example embodiment, the issue replication system 105 selects a first subset of the plurality of graph-like data structures that have a respective similarity score that falls within a range associated with the similarity threshold. In an example embodiment, there may be no historical cases that exceed the similarity score (for example, 98%). In this example scenario, there may be historical cases that fall within a range, for example, those historical cases have a similarity score between 90% and 98%. In this example embodiment, the issue replication system 105 selects the subset of the first subset that have a respective similarity score that is closest to the similarity threshold. In other words, the issue replication system 105 ranks those historical cases by similarity score and selects, for example, the top 3 historical cases to add to the issue replication case list. This indicates that there are historical cases in the resolution repository 101 have a high probability of reproducing the customer issue, and are worth considering to be added to the issue replication case list.

In an example embodiment, the issue replication system 105 determines that the respective similarity score associated with the plurality of graph-like data structures is not within a range of the similarity threshold. For example, if, after semantic matching, none of the historical cases have a similarity score equal to, or higher than 90% (and, for example, the similarity threshold is 98%), then the existing historical cases may require enhancement. In this example scenario, the issue replication system 105 identifies a first subset of the plurality of graph-like data structures for enhancement to create new graph-like data structures so that the comparison between the graph-like data structure and the new graph-like data structures results in a similarity score that is within a range associated with the similarity threshold. In an example embodiment, the issue replication system 105 identifies key steps and parameters associated with the first subset of the plurality of graph-like data structures for modification to create the new graph-like data structures. This scenario may occur when the customer issue is rare, or the resolution repository 101 is not rich with historical cases. In this example embodiment, selected historical cases require enhancement according to the correspondences between the historical cases and the customer issue key steps. Additionally, these enhanced historical cases contribute to enriching the resolution repository 101 of historical cases so that future semantic matching results in higher matching similarity scores.

Figure 5:
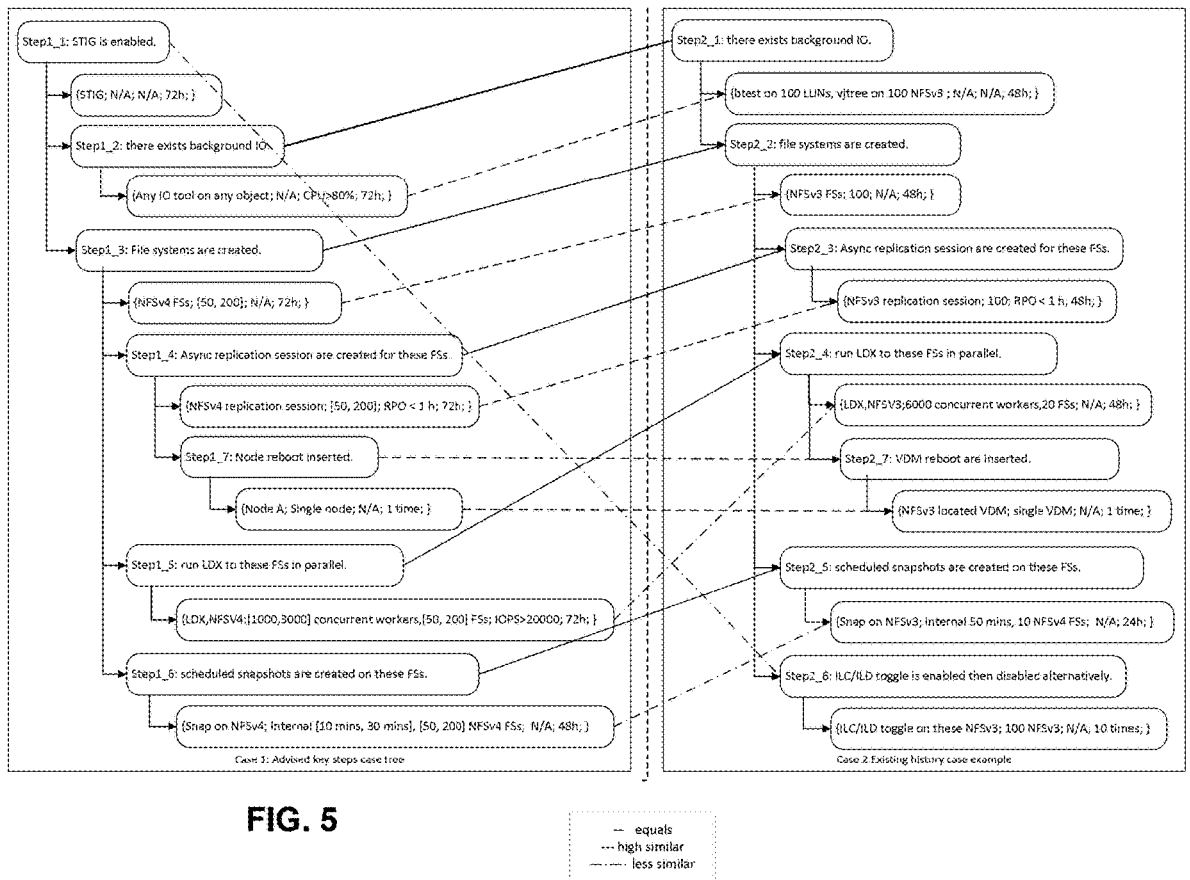
FIG. 5 illustrates an example set of correspondences between an example customer issue and a historical case in an illustrative embodiment.

FIG. 5 illustrates an example set of correspondences between a customer issue (case 1) and a historical case (case 2) that was identified by the issue replication system 105 after semantic matching. As shown in FIG. 5, steps 1_2, 1_3, 1_4, 1_5, and 1_6 of case 1 are very similar to steps 2_1, 2_2, 2_3, 2_4, and 2_5 of case 2. Step 1_7 of case 1 is very similar to step 2_7 of case 2. Step1_1 of case 1, however, is less similar than step 2_6 of case 2. The parameters of steps 1_2, 1_3, 1_4, and 1_7 are very similar with the parameters of steps 2_1, 2_2, 2_3, and 2_7. The parameters of steps 1_5, and 1_6 are very similar to the parameters of step 2_4, and 2_5. These correspondences provide a good reference for a test engineer to enhance historical cases to create new cases that match more closely to the customer issue. For example, step 1_1 and the associated parameters of case 1 may be added to case 2. Steps 2_2, 2_3, 2_4, and 2_5 of case 2 may be adjusted to NFSv4 objects, or both NFSv3 and NFSv4 objects, along with updating the corresponding parameters. Step 1_7 of case 1 may be added into case 2, while also keeping step 2_7. In an example scenario, these enhanced new historical cases may match with existing historical cases in the resolution repository 101. In an example embodiment, this result indicates that the initially defined key steps and parameters (by the architect) may have been slightly incorrect but that the issue replication system 105 is able to determine the correct key steps and parameters to replicate the customer issue.

Figure 6:
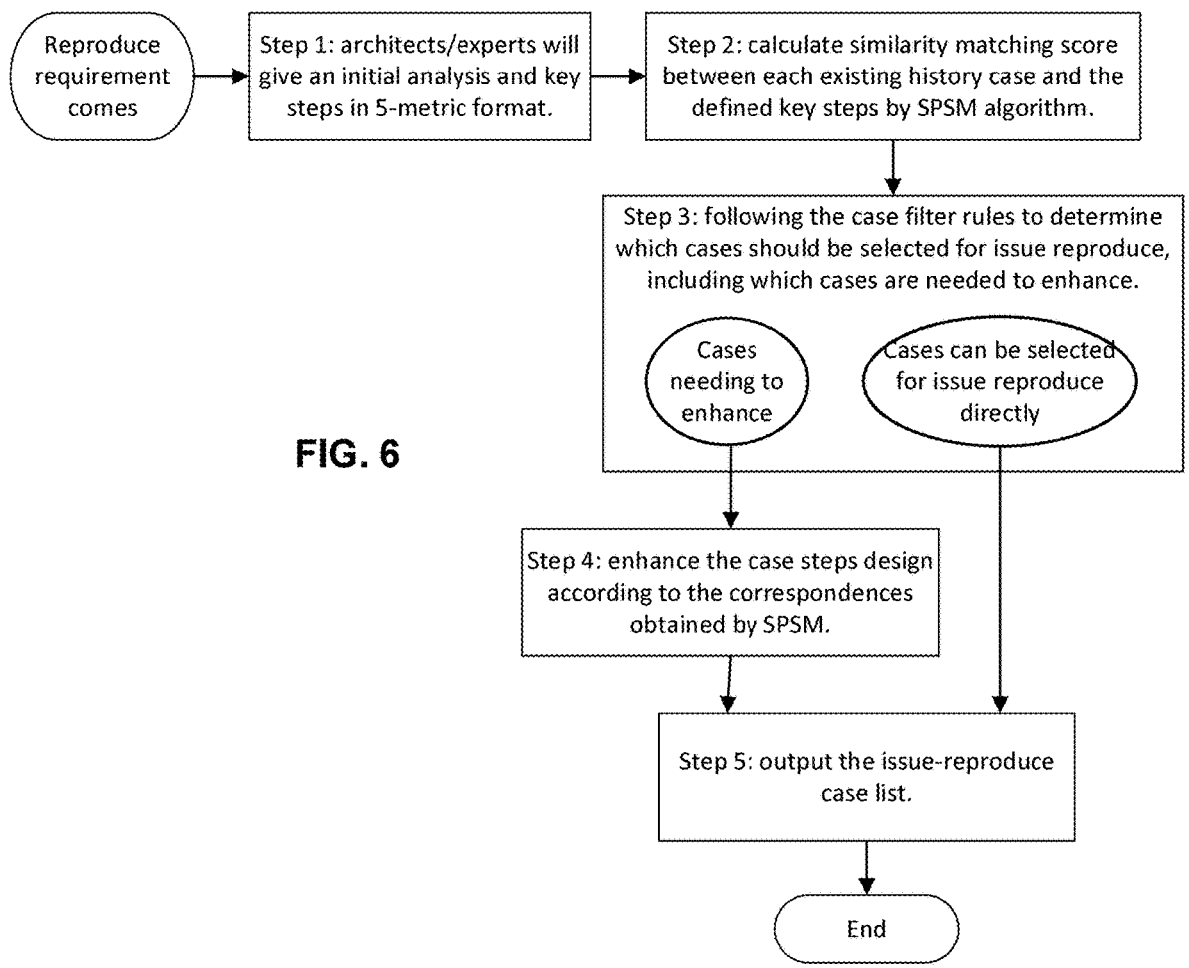
FIG. 6 illustrates a workflow diagram associated with the issue replication system in an illustrative embodiment.

At 210, the issue replication system 105 identifies at least one of the subset of the plurality of graph-like data structures for a replication effort to replicate the issue. In an example embodiment, the issue replication system 105 outputs the issue replication case list comprising the historical cases that can be used to reproduce/replicate the customer issue for faster resolution of the customer issue. In an example embodiment, the issue replication case list may also comprise the newly created enhanced historical cases. FIG. 6 illustrates a workflow diagram associated with the issue replication system 105. In an example embodiment, the issue replication system 105 outputs the key steps and parameters associated with at least one of the subset (of identified historical cases), where the key steps and parameters are used to replicate the issue for resolution of the issue.

In an example embodiment, the issue replication system 105 adds the graph-like data structure to the plurality of graph-like structures, where a similarity score is calculated between the graph-like structure and a second graph-like structure associated with a subsequent resolution request. In other words, the graph-like structure associated with the customer issue is added to the resolution repository 101 to be used for comparison with future customer issues. This iterative process enriches the resolution repository 101, producing higher similarity scores as the resolution repository 101 increases in historical cases.

Accordingly, the particular processing operations and other functionality described in conjunction with the flow diagram of FIG. 2 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to rapidly identify replication steps for the resolution of customer issues. These and other embodiments provide an issue replication system that avoids the iterative and inconsistent manual issue replication efforts. Embodiments disclosed herein provide a defined template with which to identify key steps and critical information for replication for efficient replication and resolution of customer issues. Embodiments disclosed herein provide multiple replication scenarios that expedite the issue replication and resolution process.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of the information processing system 100, these platforms may also be used to implement at least portions of other information processing systems in other embodiments.

Figure 7:
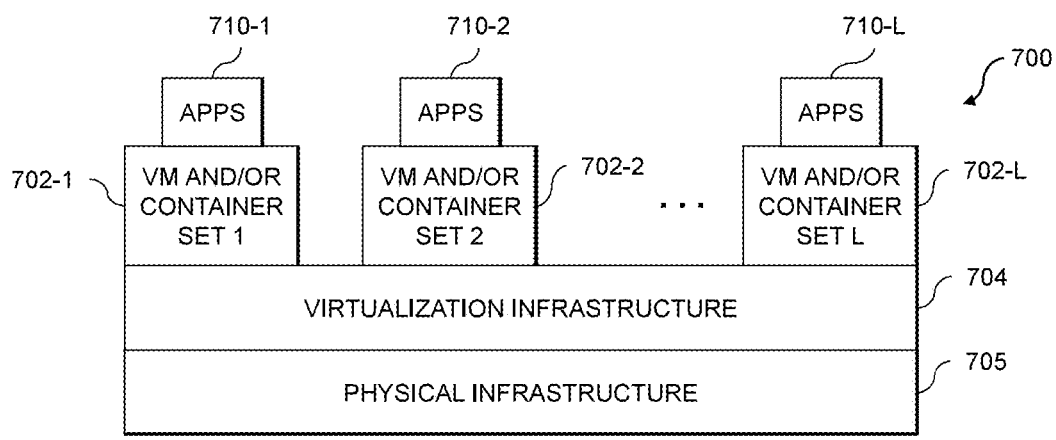
FIGS. 7 and 8 show examples of processing platforms that may be utilized to implement at least a portion of an issue replication system embodiments.
Figure 8:
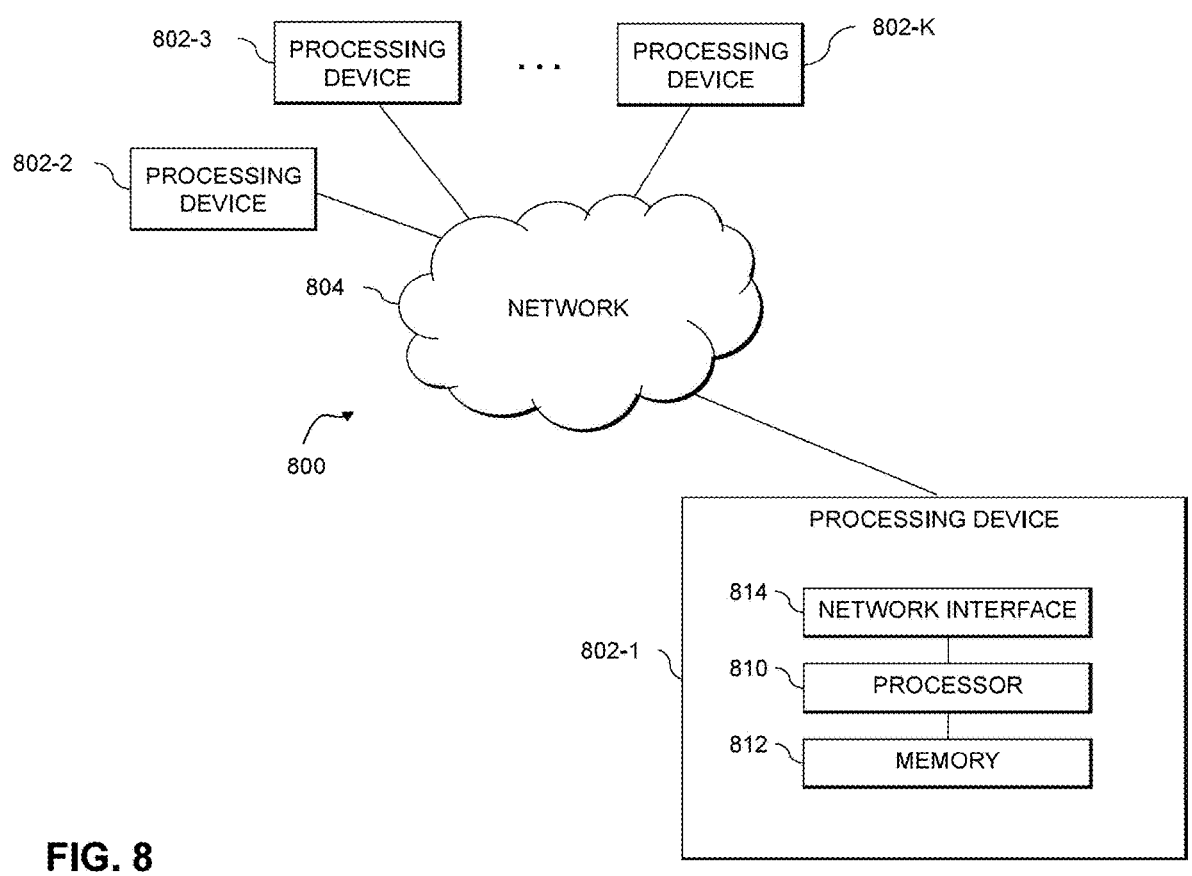

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, where the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of the information processing system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of the information processing system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an application-specific integrated circuit (ASIC), a field-programmable gate array (FPGA) or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
receiving, by an issue replication system, a resolution request from an issue resolution system, wherein the resolution request is associated with an issue occurring on an information system;
assigning at least one metric to the resolution request;
storing the at least one metric in a graph-like data structure;
calculating a similarity score between the graph-like data structure and each of a plurality of graph-like data structures from a resolution repository;
selecting a subset of the plurality of graph-like data structures based on a comparison of the similarity score with a similarity threshold; and
identifying at least one of the subset of the plurality of graph-like data structures for a replication effort to replicate the issue, wherein the method is performed by at least one processing device comprising a processor coupled to a memory.

2. The method of claim 1 further comprising:
adding the graph-like data structure to the plurality of graph-like structures, wherein a similarity score is calculated between the graph-like structure and a second graph-like structure associated with a subsequent resolution request.

3. The method of claim 1 wherein assigning the at least one metric to the resolution request comprises:
normalizing replication details associated with the issue using the at least one metric.

4. The method of claim 1 wherein the at least one metric comprises at least one of object, scale, performance, duration, and dependency.

5. The method of claim 1 wherein calculating the similarity score comprises:
generating the similarity score using semantic matching of the graph-like data structure.

6. The method of claim 5 wherein the semantic matching comprises structure preserving semantic matching.

7. The method of claim 6 wherein the graph-like data structure is a tree-like data structure.

8. The method of claim 6 wherein the at least one metric comprises at least one key step required to replicate the issue and at least one parameter associated with the at least one key step.

9. The method of claim 8 further comprising:
generating the similarity score by matching an internal node, representing the at least one key step, with a second internal node, and by matching a leaf node, representing the at least one parameter, with a second leaf node, wherein the graph-like data structure comprises the internal node and the leaf node, and wherein one of the plurality of graph-like data structures comprises the second internal node and the second leaf node.

10. The method of claim 1 wherein selecting the subset of the plurality of graph-like data structures comprises:
applying filtering rules to the plurality of graph-like data structures to obtain the subset.

11. The method of claim 10 wherein applying the filtering rules to the plurality of graph-like data structures to obtain the subset comprises:
selecting the subset of the plurality of graph-like data structures that have a respective similarity score that exceeds the similarity threshold.

12. The method of claim 10 wherein applying the filtering rules to the plurality of graph-like data structures to obtain the subset comprises:
selecting a first subset of the plurality of graph-like data structures that have a respective similarity score that falls within a range associated with the similarity threshold; and
selecting the subset of the first subset that have a respective similarity score that is closest to the similarity threshold.

13. The method of claim 10 wherein applying the filtering rules to the plurality of graph-like data structures to obtain the subset comprises:
determining that a respective similarity score associated with the plurality of graph-like data structures is not within a range of the similarity threshold; and
identifying a first subset of the plurality of graph-like data structures for enhancement to create new graph-like data structures, wherein the comparison between the graph-like data structure and the new graph-like data structures results in a similarity score that is within a range associated with the similarity threshold.

14. The method of claim 13 wherein enhancing the first subset of the plurality of graph-like data structures comprises:
identifying key steps and parameters associated with the first subset of the plurality of graph-like data structures for modification to create the new graph-like data structures.

15. The method of claim 1 wherein identifying the at least one of the subset of the plurality of graph-like data structures comprises:

outputting key steps and parameters associated with the at least one of the subset, wherein the key steps and parameters are used to replicate the issue for resolution of the issue.

16. A system comprising:
at least one processing device comprising a processor coupled to a memory;
the at least one processing device being configured:
   to receive, by an issue replication system, a resolution request from an issue resolution system, wherein the resolution request is associated with an issue occurring on an information system;
   to assign at least one metric to the resolution request;
   to store the at least one metric in a graph-like data structure;
   to calculate a similarity score between the graph-like data structure and each of a plurality of graph-like data structures from a resolution repository;
   to select a subset of the plurality of graph-like data structures based on a comparison of the similarity score with a similarity threshold; and
   to identify at least one of the subset of the plurality of graph-like data structures for a replication effort to replicate the issue.

17. The system of claim 16 further configured to:
add the graph-like data structure to the plurality of graph-like structures, wherein a similarity score is calculated between the graph-like structure and a second graph-like structure associated with a subsequent resolution request.

18. The system of claim 16 wherein the graph-like data structure is a tree-like data structure.

19. The system of claim 18 further configured to:
generate the similarity score using structure preserving semantic matching of the tree-like data structure.

20. A computer program product comprising a non-transitory processor-readable storage medium having stored therein program code of one or more software programs, wherein the program code when executed by at least one processing device causes said at least one processing device:
   to receive, by an issue replication system, a resolution request from an issue resolution system, wherein the resolution request is associated with an issue occurring on an information system;
   to assign at least one metric to the resolution request;
   to store the at least one metric in a graph-like data structure;
   to calculate a similarity score between the graph-like data structure and each of a plurality of graph-like data structures from a resolution repository;
   to select a subset of the plurality of graph-like data structures based on a comparison of the similarity score with a similarity threshold; and
   to identify at least one of the subset of the plurality of graph-like data structures for a replication effort to replicate the issue.

* * * * *